(12) United States Patent
Yamada

(10) Patent No.: US 10,850,585 B2
(45) Date of Patent: Dec. 1, 2020

(54) STRUT-TYPE SUSPENSION APPARATUS

(71) Applicant: TOYOTA JIDOSHA KABUSHIKI KAISHA, Toyota (JP)

(72) Inventor: Masahiko Yamada, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 16/180,198

(22) Filed: Nov. 5, 2018

(65) Prior Publication Data

US 2019/0193504 A1 Jun. 27, 2019

(30) Foreign Application Priority Data

Dec. 25, 2017 (JP) ................................ 2017-247884

(51) Int. Cl.
| | |
|---|---|
| *B60G 15/06* | (2006.01) |
| *B60K 7/00* | (2006.01) |
| *B60G 3/20* | (2006.01) |
| *B60K 17/04* | (2006.01) |

(52) U.S. Cl.
CPC ............ *B60G 15/067* (2013.01); *B60G 3/20* (2013.01); *B60K 7/0007* (2013.01); *B60K 17/046* (2013.01); *B60G 2200/144* (2013.01); *B60G 2200/422* (2013.01); *B60G 2204/129* (2013.01); *B60G 2204/182* (2013.01); *B60G 2300/50* (2013.01); *B60K 17/043* (2013.01); *B60K 2007/0038* (2013.01); *B60K 2007/0061* (2013.01)

(58) Field of Classification Search
CPC .......... B60G 15/067; B60G 3/00; B60G 3/20; B60G 2204/182; B60G 2204/129; B60K 7/0007; B60K 17/043; B60K 2007/0038; B60K 2007/0061
See application file for complete search history.

(56) References Cited

U.S. PATENT DOCUMENTS

| | | | | |
|---|---|---|---|---|
| 4,159,125 | A * | 6/1979 | Buchwald ................ | B60G 3/06 180/253 |
| 4,341,396 | A * | 7/1982 | Decouzon .............. | B60G 3/265 280/124.145 |

(Continued)

FOREIGN PATENT DOCUMENTS

JP 2013-163401 A 8/2013

*Primary Examiner* — Frank B Vanaman
(74) *Attorney, Agent, or Firm* — Sughrue Mion, PLLC

(57) ABSTRACT

A strut-type suspension apparatus, including: a steering knuckle rotatably holding a wheel; a shock absorber configured to damp a relative movement of the wheel and a vehicle body in an up-down direction; and an in-wheel motor unit including a motor, a speed reducer configured to transmit rotation of the motor while reducing a speed of the rotation, and a housing in which the motor and the speed reducer are housed, wherein the in-wheel motor unit is fixed to the steering knuckle while the shock absorber is fixed to the in-wheel motor unit, so that the shock absorber is connected to the steering knuckle via the in-wheel motor unit, wherein the housing includes a first bracket in which a through-hole is formed and a second bracket disposed under the first bracket, and wherein the shock absorber passes through the through-hole of the first bracket and is fastened to the second bracket.

8 Claims, 8 Drawing Sheets

(56) References Cited

U.S. PATENT DOCUMENTS

| | | | | |
|---|---|---|---|---|
| 5,192,100 | A | * | 3/1993 | Rumpel ............... B60G 11/56 280/124.143 |
| 6,126,198 | A | * | 10/2000 | Handke ............... B60G 13/006 280/124.145 |
| 2006/0219449 | A1 | * | 10/2006 | Mizutani ............... H02K 9/19 180/65.51 |
| 2007/0272458 | A1 | * | 11/2007 | Taniguchi ........... B60L 15/2054 180/65.51 |
| 2008/0223638 | A1 | * | 9/2008 | Niwa ............... B60K 7/0007 180/65.51 |
| 2018/0347657 | A1 | * | 12/2018 | Hinz ............... B60G 3/06 |

* cited by examiner

# STRUT-TYPE SUSPENSION APPARATUS

CROSS REFERENCE TO RELATED APPLICATION

The present application claims priority from Japanese Patent Application No. 2017-247884, which was filed on Dec. 25, 2017, the disclosure of which is herein incorporated by reference in its entirety.

BACKGROUND

Technical Field

The following disclosure relates to a strut-type suspension apparatus for a vehicle on which an in-wheel motor is installed.

Description of Related Art

A strut-type suspension apparatus is simple in structure and is constituted by the reduced number of components, resulting in a cost reduction. It is thus desirable to employ the strut-type suspension apparatus in an electric-motor driven vehicle (electric vehicle) on which an in-wheel motor is installed. Japanese Patent Application Publication No. 2013-163401 describes a strut-type suspension apparatus in which a shock absorber that constitutes a strut is connected to a steering knuckle via an in-wheel motor unit.

SUMMARY

In the case where the strut-type suspension apparatus is employed in the electric vehicle on which the in-wheel motor is installed, however, there remains much room for improvement in an installation structure of the in-wheel motor unit. That is, various modifications to the installation structure improve the utility of the electric vehicle. Accordingly, the present disclosure relates to a strut-type suspension apparatus for achieving an electric vehicle having high utility.

In a strut-type suspension apparatus according to one aspect of the present disclosure, an in-wheel motor unit is fixed to a steering knuckle while a shock absorber is fixed to the in-wheel motor unit, so that the shock absorber is connected to the steering knuckle via the in-wheel motor unit. Further, a housing of the in-wheel motor unit includes a first bracket in which a through-hole is formed and a second bracket disposed under the first bracket, and the shock absorber passes through the through-hole of the first bracket and is fastened to the second bracket.

Advantageous Effects

According to the strut-type suspension apparatus constructed as described above, the shock absorber is fixed to the in-wheel motor unit utilizing the first bracket and the second bracket formed integrally with the housing of the in-wheel motor unit, such that the shock absorber passes through the through-hole of the first bracket and is fastened to the second bracket. That is, the strut-type suspension apparatus according to the present disclosure enables the shock absorber to be fixed to the in-wheel motor unit with a relatively simple structure.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Figure 1:
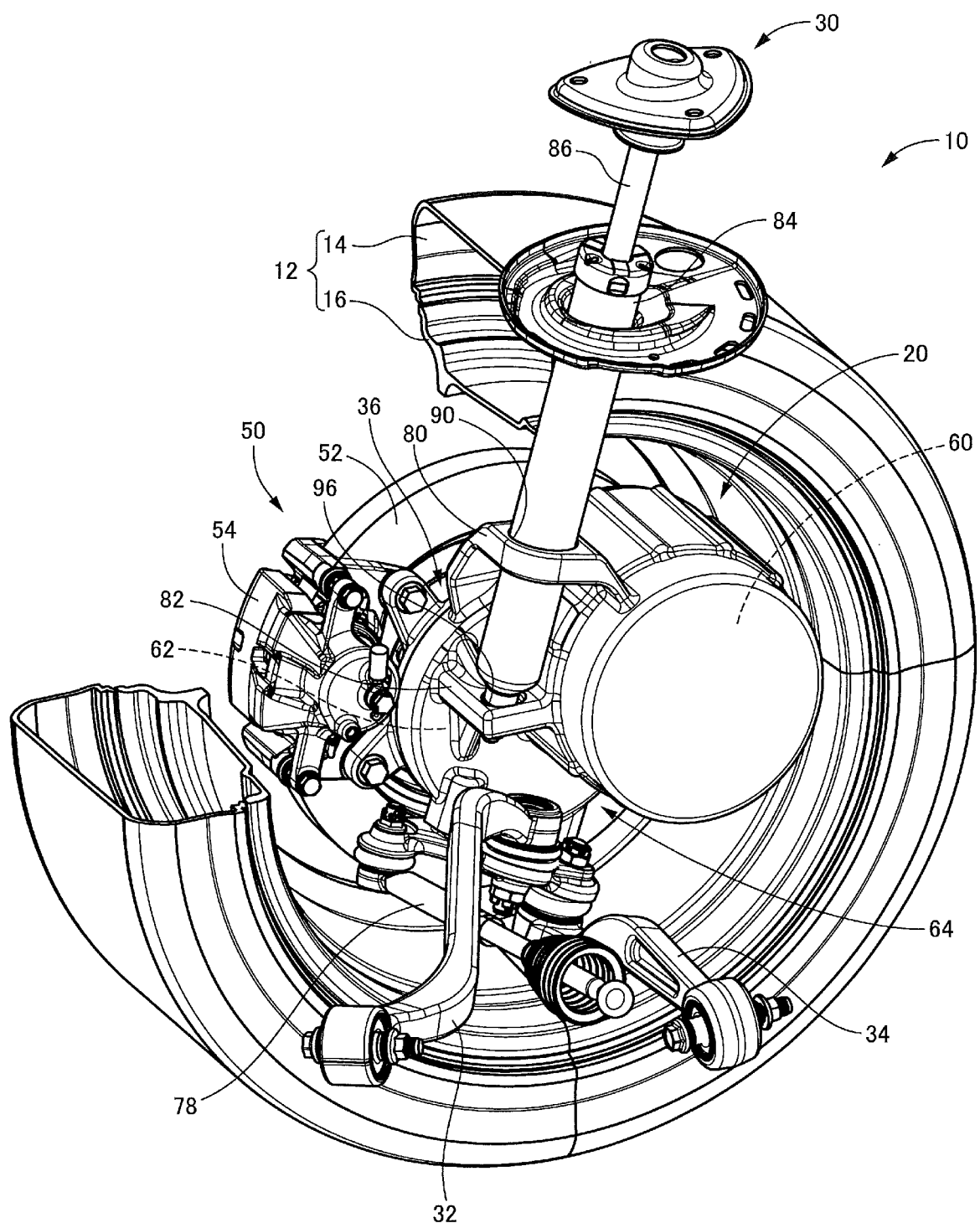
FIG. 1 is a perspective view of a strut-type suspension apparatus according to a first embodiment.
Figure 2:
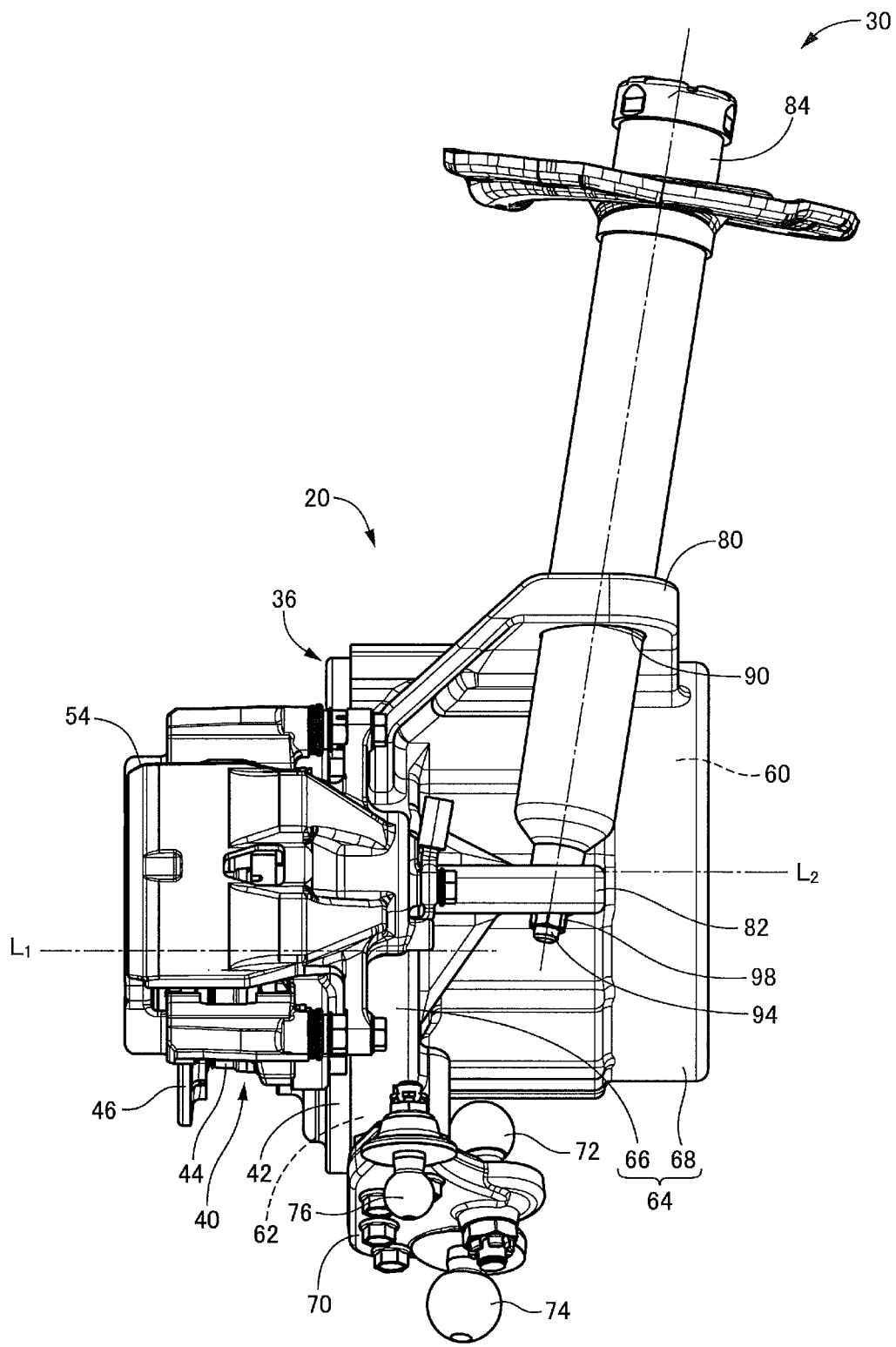
FIG. 2 is a view of the strut-type suspension apparatus according to the first embodiment, the view seen from a front side of a vehicle.

Referring to the drawings, there will be explained below in detail embodiments of the invention. It is to be understood that the invention is not limited to the details of the following embodiments but may be embodied with changes and modifications based on the knowledge of those skilled in the art.

1. First Embodiment

FIGS. 1-5 show a strut-type suspension apparatus 10 according to a first embodiment. A vehicle on which the strut-type suspension apparatus 10 is installed is an electric-motor driven vehicle (electric vehicle) and includes in-wheel motor units provided for respective wheels. The suspension apparatus 10 is provided for each of front right and left wheels 12. As shown in the perspective view of FIG. 1, the front wheel 12 includes a tire 14 and a wheel body 16 (hereinafter simply referred to as "wheel 16"), and an in-wheel motor unit 20 is housed inside the wheel 16.

The suspension apparatus 10 includes: a shock absorber 30 that constitutes a strut; two lower arms 32, 34; and a steering knuckle 36. As later explained in detail, the shock absorber 30 and the two lower arms 32, 34 are connected to the steering knuckle 36 via the in-wheel motor unit 20. That is, in the suspension apparatus 10, the in-wheel motor unit 20 is also a constituent element of the suspension apparatus 10.

The steering knuckle 36 includes a bearing 40. The bearing 40 is configured such that an outer race thereof is fixed to a knuckle main body 42 and an inner race 44 thereof is rotatably held by the outer race. A hub 46 is fixed to the inner race 44, and the wheel 16 of the front wheel 12 is fixed to the hub 46, whereby the steering knuckle 36 rotatably holds the front wheel 12. A disc brake device 50 is provided on the steering knuckle 36. Specifically, a disc rotor 52 is fixed to the inner race 44 of the bearing 40, and a caliper 54 is held by the knuckle main body 42.

The in-wheel motor unit 20 is fixed to the steering knuckle 36. The in-wheel motor unit 20 includes a motor 60 for driving the front wheel 12, a speed reducer 62 configured to transmit, to the front wheel 12, rotation of the motor 60 while reducing a speed of the rotation, and a housing 64 in which the motor 60 and the speed reducer 62 are housed. The housing 64 is fixed to the knuckle main body 42 of the steering knuckle 36. The knuckle main body 42 closes an opening of the housing 64 located on one side thereof near to the wheel and functions as a part of a housing of the in-wheel motor unit 20.

Figure 3:
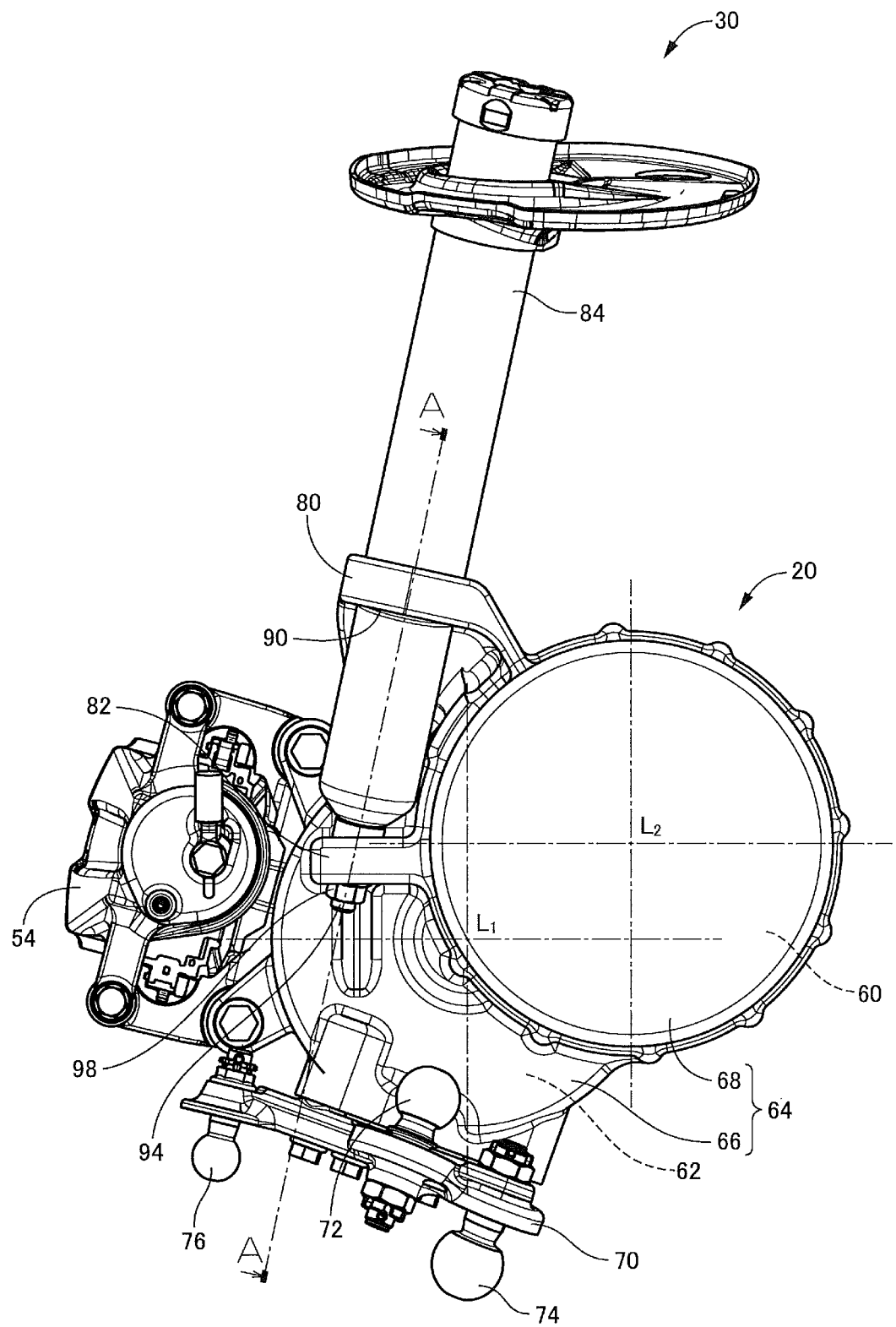
FIG. 3 is a view of the strut-type suspension apparatus according to the first embodiment, the view seen from an inner side of the vehicle in a width direction of the vehicle.
Figure 4:
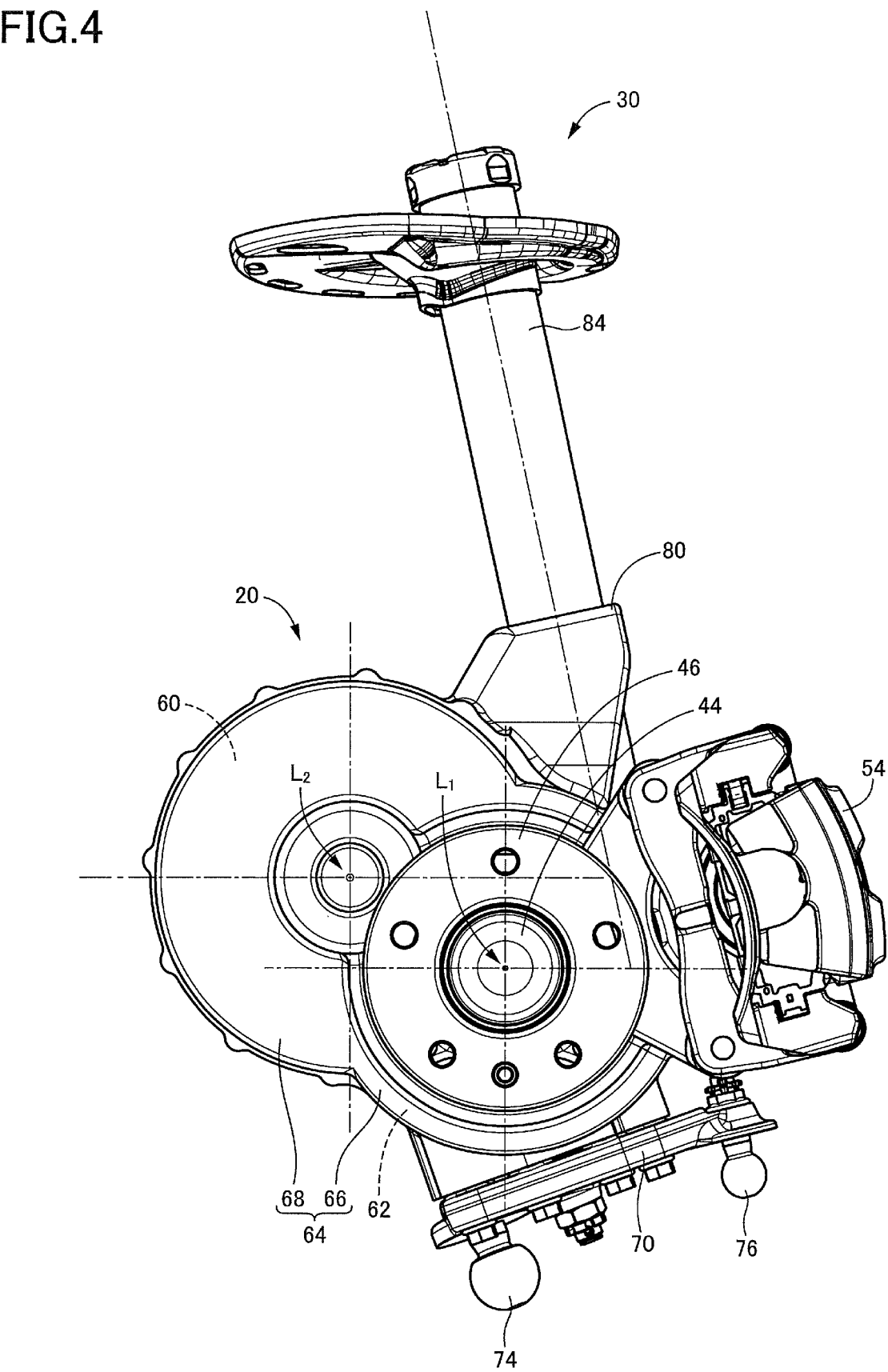
FIG. 4 is a view of the strut-type suspension apparatus according to the first embodiment, the view seen from an outer side of the vehicle in the width direction of the vehicle.

Illustration of an inside of the in-wheel motor unit 20, namely, illustration of structures of the motor 60 and the speed reducer 62, is substantially omitted and briefly explained. There may be employed, as the speed reducer 62, various types of speed reducers such as a planetary gear mechanism. The speed reducer 62 is housed in a speed-reducer housing portion 66 of the housing 64. The motor 60 includes a rotor and a stator and is housed in a motor housing portion 68 of the housing 64. The housing 64 has a shape in which two cylinders having mutually different axial dimensions are joined such that respective axes of the two cylinders are parallel to each other. One of the two cylinders having a smaller axial dimension is the speed-reducer housing portion 66, and the other of the two cylinders having a larger axial dimension is the motor housing portion 68. As shown in FIGS. 3 and 4, an axis $L_1$ of the speed-reducer housing portion 66 and an axis $L_2$ of the motor housing portion 68 are shifted relative to each other, such that the motor housing portion 68 is shifted upward and toward a rear side of the vehicle with respect to the speed-reducer housing portion 66.

While not shown, the speed reducer 62 includes an output shaft to the front wheel 12, and the axis $L_1$ of the speed-reducer housing portion 66 coincides with a rotation axis of the output shaft of the speed reducer 62. The output shaft of the speed reducer 62 is connected to the inner race 44 of the bearing 40. That is, the rotation axis of the output shaft of the speed reducer 62 coincides with a rotation axis of the front wheel 12. A rotation axis of the motor 60 coincides with the axis $L_2$ of the motor housing portion 68. The motor 60 is disposed such that the rotation axis thereof is shifted upward and toward the rear side of the vehicle with respect to the rotation axis of the output shaft of the speed reducer 62.

The shock absorber 30 and the two lower arms 32, 34 are connected to the housing 64 of the in-wheel motor unit 20. A connecting member 70 is fixed to a lower end of the housing 64 for connecting the lower arms 32, 34 to the housing 64. To the connecting member 70, the two lower arms 32, 34 are connected through respective ball joints 72, 74. In FIGS. 2-5, only a ball stud of each ball joint 72, 74 is illustrated.

In the suspension apparatus 10 according to the present embodiment, the in-wheel motor unit 20 is fixed to the steering knuckle 36, so that connected portions of the respective lower arms 32, 34 to the front wheel 12 are located relatively spaced apart from the front wheel 12 inwardly in a width direction of the vehicle. In the suspension apparatus 10 of the present embodiment, however, a virtual king pin axis is formed by connecting: a point of intersection of two extension lines of respective axes of the two lower arms 32, 34; and a connection point of the shock absorber 30 to a body of the vehicle. Accordingly, even though the connected portions of the lower arms 32, 34 to the front wheel 12 are spaced apart from the front wheel 12 inwardly in the vehicle width direction, a point of intersection of the king pin axis and the road surface does not deviate from the center of a contact surface of the tire contacting the ground.

A tie rod 78 is connected to a front portion of the connecting member 70 via a ball joint 76. There is input, to the connecting member 70, a movement of the tie rod 78 in its axial direction in accordance with a steering operation, and the steering knuckle 36 and the in-wheel motor unit 20 are pivoted about the virtual king pin axis described above, so that the front wheel 12 is steered (turned).

There will be next explained a connecting structure connecting the in-wheel motor unit 20 and the shock absorber 30. A first bracket 80 and a second bracket 82 are formed on the housing 64 of the in-wheel motor unit 20, specifically, on the motor housing portion 68 of the housing 64. A cylinder 84 of the shock absorber 30 is fixed to the two brackets 80, 82. An upper end portion of a piston rod 86 that extends upward from the cylinder 84 is connected to the body of the vehicle.

The first bracket 80 and the second bracket 82 are formed so as to protrude from the motor housing portion 68 of the housing 64 toward a front side of the vehicle. There will be first explained an attaching structure for attaching the cylinder 84 of the shock absorber 30 to the first bracket 80. The first bracket 80 has a through-hole 90. The cylinder 84 of the shock absorber 30 has a tapered portion 92 located at an axially intermediate position thereof. Thus, the cylinder 84 has a larger outside diameter at its upper portion than at its lower portion. An inside diameter of the through-hole 90 of the first bracket 80 is larger than the outside diameter of the lower portion of the cylinder 84 and slightly smaller than the outside diameter of the upper portion of the cylinder 84. The cylinder 84 of the shock absorber 30 has a minus clearance with respect to the through-hole 90 of the first bracket 80. Accordingly, the cylinder 84 of the shock absorber 30 is press-fitted in the through-hole 90 of first bracket 80, so as to be engaged with the through-hole 90 with a tight fit.

The cylinder 84 of the shock absorber 30 is fastened to the second bracket 82. Specifically, a bolt 94 is fixed by welding to a lower end of the cylinder 84 so as to be coaxial with the cylinder 84. A mounting hole 96 is formed in the second bracket 82. The bolt 94 fixed to the cylinder 84 is inserted through the mounting hole 96, and a nut 98 is threadedly engaged with the bolt 94. In this way, the cylinder 84 is fastened to the second bracket 82. That is, by tightening the nut 98 on the bolt 94 of the cylinder 84 while being threadedly engaged with the bolt 94, the press-fitting of the cylinder 84 into the through-hole 90 of the first bracket 80 is completed concurrently. While an external thread is formed at the lower end of the shock absorber 30 in the present embodiment, an internal thread may be formed.

As explained above, in the strut-type suspension apparatus 10 of the present embodiment, the shock absorber 30 is fixed to the in-wheel motor unit 20 such that the shock absorber 30 passes through the through-hole 90 of the first bracket 80 and is fastened to the second bracket 82. That is, according to the strut-type suspension apparatus 10 of the present embodiment, the shock absorber 30 can be fixed easily and firmly to the in-wheel motor unit 20 with a simple structure.

In the suspension apparatus 10 of the present embodiment, the rotation axis of the motor 60 is shifted with respect to the rotation axis of the output shaft of the speed reducer 62. The motor 60 and the speed reducer 62 may be disposed such that the rotation axis of the motor 60 and the rotation axis of the output shaft of the speed reducer 62 coincide with the rotation axis of the wheel. In the suspension apparatus 10 of the present embodiment, the first bracket 80 and the second bracket 82 are formed so as to protrude from the motor housing portion 68 of the housing 64 toward one of opposite sides of the motor 60 in the front-rear direction of the vehicle that is remote from the other of the opposite sides thereof toward which the motor 60 is shifted. It is thus possible to make inclination of the shock absorber 30 in the front-rear direction smaller in the present suspension apparatus 10 than in an arrangement in which the shock absorber is fixed to an in-wheel motor unit in which the rotation axis of the motor and the rotation axis of the output shaft of the speed reducer coincide with the rotation axis of the wheel.

Figure 5:
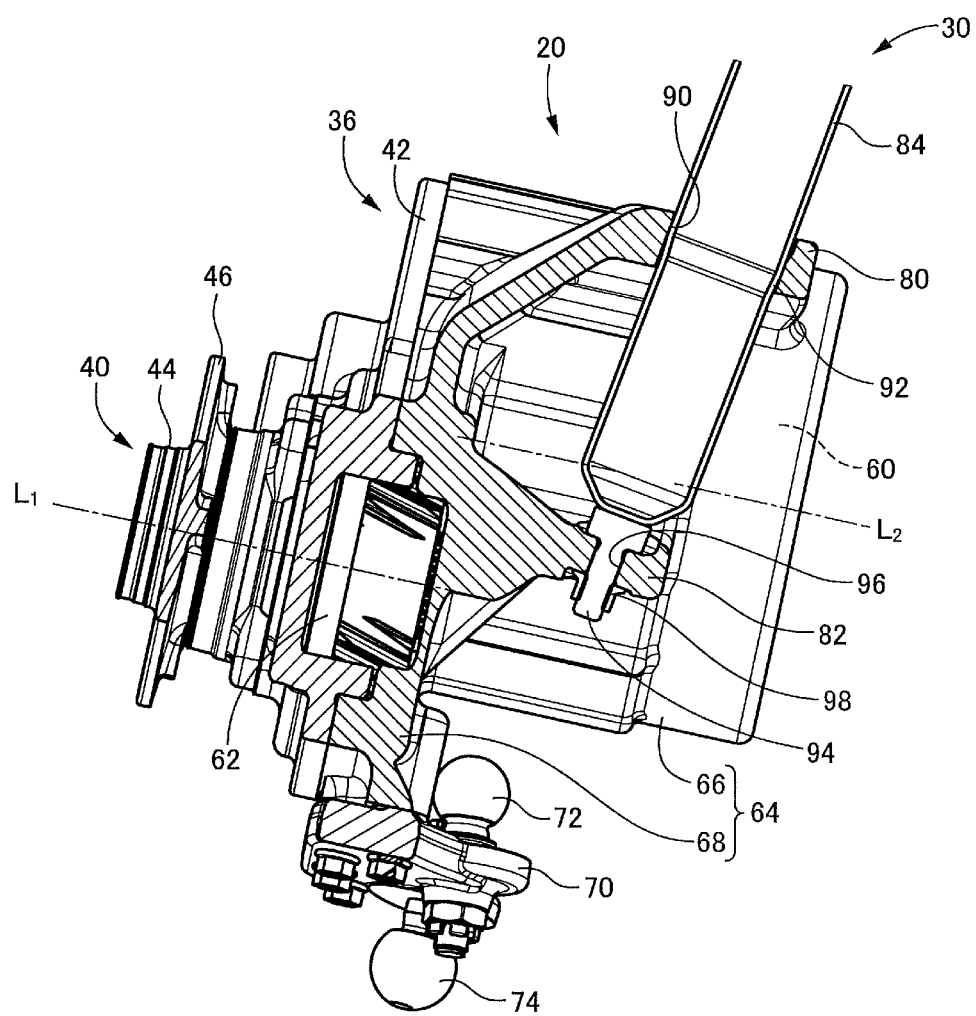
FIG. 5 is a cross-sectional view (taken along the line A-A in FIG. 3) of the strut-type suspension apparatus according to the first embodiment, the view seen from the front side of the vehicle.

The housing 64 is formed by casting, and the speed-reducer housing portion 66, the motor housing portion 68, and the two brackets 80, 82 are formed integrally with one another. As shown in FIG. 5, a portion of each of the first bracket 80 and the second bracket 82 to which the cylinder 84 of the shock absorber 30 is connected is formed to have a flat shape parallel to the axis $L_2$ of the motor housing portion 68. For instance, two molds for casting the housing 64 are configured such that the two molds are separated on a plane intersecting the axis $L_2$ and such that the two molds are separated at portions where the two brackets 80, 82 are formed, so as to provide a right portion and a left portion of the housing 64 shown in FIG. 5. Thus, complicated or cumbersome casting using slide molds and cores is not required for forming the housing 64. That is, the housing 64 used in the suspension apparatus 10 of the present embodiment can be easily formed by casting.

The shock absorber 30 is formed such that the cylinder 84 and the bolt 94 are coaxial with each other. That is, the through-hole 90 of the first bracket 80 and the mounting hole 96 of the second bracket 82 are formed such that respective axes thereof coincide with each other. Thus, when the through-hole 90 of the first bracket 80 and the mounting hole 96 of the second bracket 82 are formed in a manufacturing process of the housing 64 of the in-wheel motor unit 20, it is possible to perform a drilling work in one stroke in a state in which the housing as a workpiece is positioned in place.

2. Second Embodiment

Figure 6:
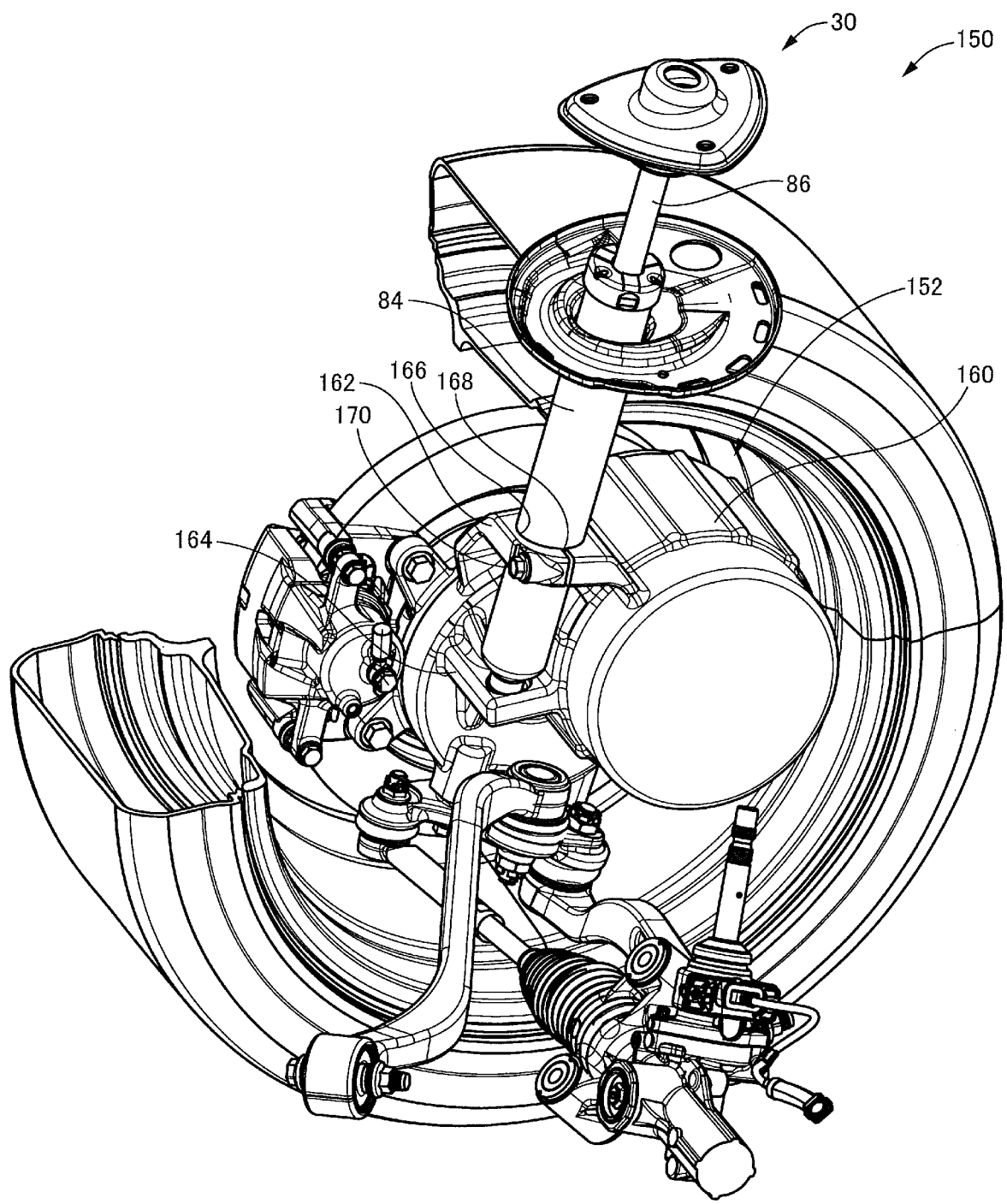
FIG. 6 is a perspective view of a strut-type suspension apparatus according to a second embodiment.
Figure 7:
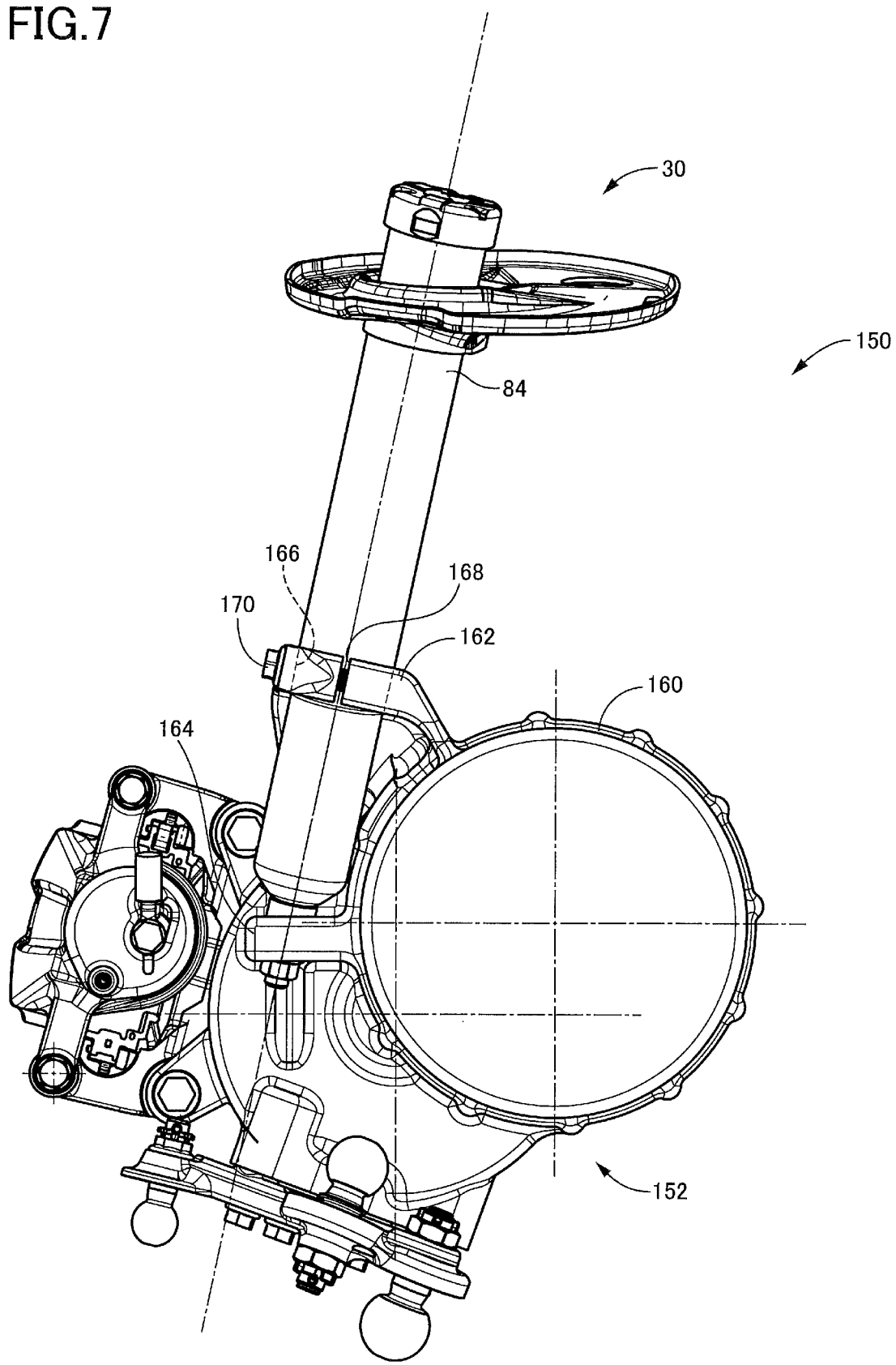
FIG. 7 is a view of the strut-type suspension apparatus according to the second embodiment, the view seen from the inner side of the vehicle in the width direction of the vehicle.

FIGS. 6 and 7 show a strut-type suspension apparatus 150 according to a second embodiment. The suspension apparatus 150 of the second embodiment is substantially identical in construction with the suspension apparatus 10 of the first embodiment except for an attaching structure for attaching the shock absorber 30 to an in-wheel motor unit 152. Thus, the same reference numerals as used in the first embodiment are used to identify corresponding components of the suspension apparatus 150 of the second embodiment.

The in-wheel motor unit 152 of the suspension apparatus 150 of the second embodiment differs from the in-wheel motor unit 20 of the suspension apparatus 10 of the first embodiment in that the housing 160 differs in shape from the housing 64. Specifically, like the housing 64 of the first embodiment, the housing 160 of the second embodiment includes a first bracket 162 and a second bracket 164. The second bracket 164 is similar to the second bracket 82 of the first embodiment whereas the first bracket 162 differs from the first bracket 80 of the first embodiment. The first bracket 162 of the second embodiment includes a through-hole 166 and a slit 168 extending from the through-hole 166 to an outer periphery of the through-hole 166. The slit 168 is a cutout extending from the through-hole 166 in the radial direction. Specifically, the slit 168 is a space formed by cutting and dividing the first bracket 162 on a plane which is parallel to the radial direction of the through-hole 166 and in which the axis of the through-hole 166 is included. An internally threaded hole is formed in the first bracket 162 so as to extend across the slit 168 in a direction orthogonal to the slit 168. A bolt 170 is threadedly engaged with the internally threaded hole such that a width of the slit 168 is reduced and a diameter of the through-hole 166 is reduced. That is, the cylinder 84 of the shock absorber 30 is fastened to the first bracket 162 such that, in a state in which the cylinder 84 of the shock absorber 30 passes through the through-hole 166 of the first bracket 162, the diameter of the through-hole 166 is reduced by reducing the width of the slit 168 of the first bracket 162.

As compared with the suspension apparatus 10 of the first embodiment, the strut-type suspension apparatus 150 of the second embodiment needs formation of the slit 168 of the first bracket 162 in a manufacturing process of the housing and requires the bolt 170 additionally in attaching the shock absorber 30 to the in-wheel motor unit 152. Nevertheless, the suspension apparatus 150 of the second embodiment is sufficiently simple in construction. In the strut-type suspension apparatus 150 of the second embodiment, when it is necessary to remove the shock absorber 30 from the in-wheel motor unit, the shock absorber 30 can be easily removed from the in-wheel motor unit by removing the bolt 170 by which the shock absorber 30 is fastened to the first bracket 162 and the nut 98 by which the shock absorber 30 is fastened to the second bracket 164.

3. Third Embodiment

Figure 8:
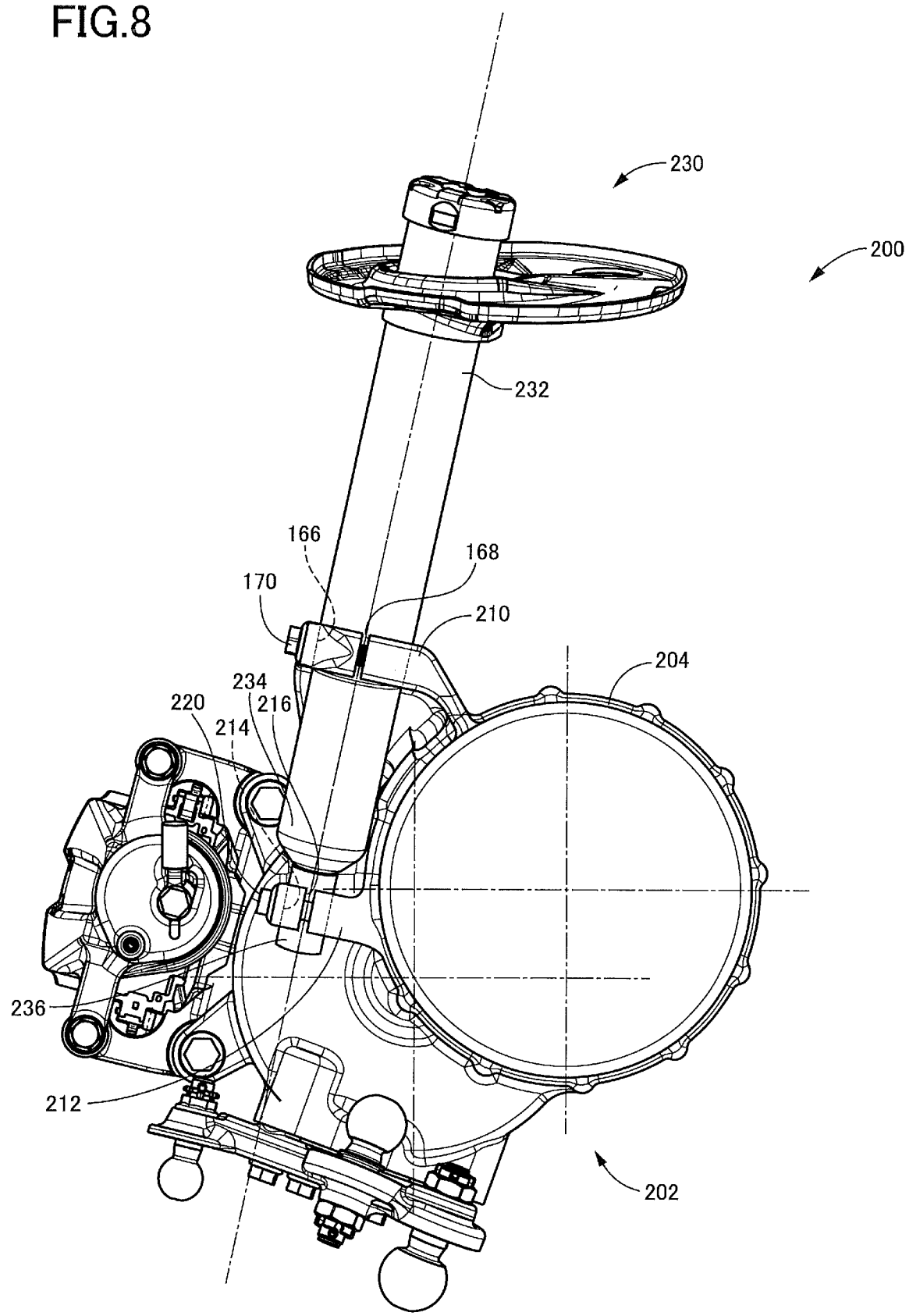
FIG. 8 is a view of a strut-type suspension apparatus according to a third embodiment, the view seen from the inner side of the vehicle in the width direction of the vehicle.

FIG. 8 shows a strut-type suspension apparatus 200 according to a third embodiment. The strut-type suspension apparatus 200 of the third embodiment differs from the strut-type suspension apparatus 10 of the first embodiment and the strut-type suspension apparatus 150 of the second embodiment in that a housing 204 of an in-wheel motor unit 202 differs in shape from the housing 64 of the first embodiment and the housing 160 of the second embodiment.

Like the housings 64, 160 of the illustrated first and second embodiments, the housing 204 of the third embodiment includes a first bracket 210 and a second bracket 212. The first bracket 210 is similar to the first bracket 162 of the second embodiment whereas the second bracket 212 differs from the second brackets 82, 164 of the illustrated two embodiments. Like the first bracket 210, the second bracket 212 of the third embodiment has a through-hole 214 and a slit 216 extending from the through-hole 214 to an outer periphery of the through-hole 214. Further, the second bracket 212 has an internally threaded hole formed so as to extend across the slit 216 in a direction orthogonal to the slit 216. A bolt 220 is threadedly engaged with the internally threaded hole, such that a width of the slit 216 is reduced and a diameter of the through-hole 214 is reduced.

A cylinder 232 of a shock absorber 230 of the third embodiment does not have a bolt at its lower end. Instead, a cylindrical member 236 having an outside diameter smaller than that of a cylinder body 234 of the cylinder 232 is fixed to a lower end of the cylinder body 234 so as to be coaxial with the cylinder body 234. The cylinder 232 of the shock absorber 230 is fastened to the second bracket 21 such that, in a state in which the cylindrical member 236 passes through the through-hole 214 of the second bracket 212, the diameter of the through-hole 214 is reduced by reducing the width of the slit 216 of the second bracket 212.

In the strut-type suspension apparatus 200 of the third embodiment, the bolt 170 by which the shock absorber 230 is fastened to the first bracket 210 and the bolt 220 by which the shock absorber 230 is fastened to the second bracket 212 can be tightened and untightened from the same direction, so that the shock absorber 230 can be installed on and removed from the in-wheel motor unit with ease.

What is claimed is:

1. A strut suspension apparatus, comprising:
a steering knuckle rotatably holding a wheel and configured to pivot in accordance with a steering operation;
a shock absorber configured to damp a relative movement of the wheel and a body of a vehicle in an up-down direction; and
an in-wheel motor unit including a motor for driving the wheel, a speed reducer configured to transmit, to the wheel, rotation of the motor while reducing a speed of the rotation, and a housing in which the motor and the speed reducer are housed,
wherein the in-wheel motor unit is fixed to the steering knuckle while the shock absorber is fixed to the in-wheel motor unit, so that the shock absorber is connected to the steering knuckle via the in-wheel motor unit,
wherein the housing of the in-wheel motor unit includes a first bracket in which a through-hole is formed and a second bracket disposed under the first bracket, and
wherein the shock absorber passes through the through-hole of the first bracket and is fastened to the second bracket,
wherein the speed reducer includes an output shaft to the wheel,
wherein the motor is disposed such that a rotation axis of the motor is shifted in a front-rear direction of a vehicle with respect to a rotation axis of the output shalt of the speed reducer,
wherein the first bracket and the second bracket protrude from a portion of the housing of the in-wheel motor unit in which the motor is housed, toward one of opposite sides of the motor in the front-rear direction that is remote from the other of the opposite sides of the motor in the front-rear direction toward which the motor is shifted,
wherein the portion of the housing of the in-wheel motor unit in which the motor is housed has a cylindrical shape, and
wherein a portion of the first bracket in which the through-hole is formed and a portion of the second bracket to which the shock absorber is fastened are formed to have a flat shape parallel to an axis of the portion of the housing in which the motor is housed.

2. The strut suspension apparatus according to claim 1, wherein one of an external thread and an internal thread is formed at a lower end portion of the shock absorber, and
wherein a fastening member on which the other of the external thread and the internal thread is formed is threadedly engaged with the one of the external thread and the internal thread of the shock absorber utilizing a mounting hole formed in the second bracket, so that the shock absorber is fastened to the second bracket.

3. The strut suspension apparatus according to claim 2, wherein the through-hole of the first bracket and the mounting hole of the second bracket are formed such that respective axes thereof coincide with each other.

4. The strut suspension apparatus according to claim 1, wherein the second bracket has a through-hole and a slit extending from the through-hole to an outer periphery of the through-hole, and
wherein the shock absorber is fastened to the second bracket such that, in a state in which the shock absorber passes through the through-hole of the second bracket, a diameter of the through-hole is reduced by reducing a width of the slit of the second bracket.

5. The strut suspension apparatus according to claim 4, wherein the through-hole of the first bracket and the through-hole of the second bracket are formed such that respective axes thereof coincide with each other.

6. The strut suspension apparatus according to claim 1, wherein the shock absorber is fitted in the through-hole of the first bracket with a tight fit.

7. The strut suspension apparatus according to claim 1, wherein the first bracket has a slit extending from the through-hole to an outer periphery of the through-hole, and
wherein the shock absorber is fastened to the first bracket such that, in a state in which the shock absorber passes through the through-hole of the first bracket, a diameter of the through-hole is reduced by reducing a width of the slit of the first bracket.

8. The strut suspension apparatus according to claim 1, wherein the motor is disposed so as to be shifted toward a rear side of the vehicle with respect to the speed reducer, and
wherein the first bracket and the second bracket protrude toward a front side of the vehicle.

* * * * *